Figure 1:
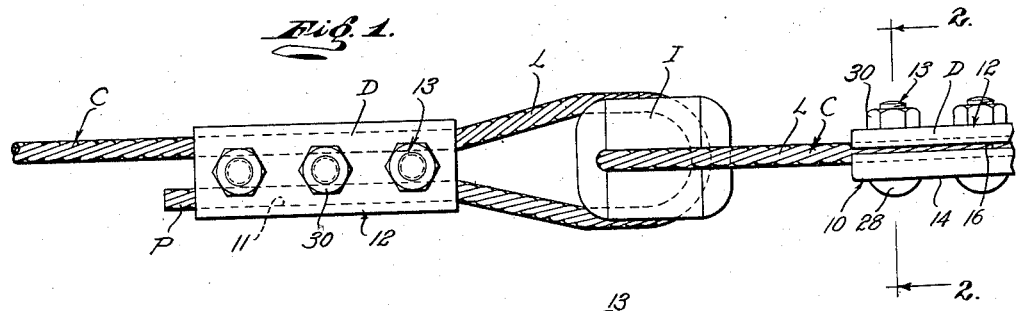

Jan. 7, 1936.  E. W. COOPER  2,026,824

CABLE CLAMP

Filed June 23, 1934

Inventor
Ellis W. Cooper
By
His Attorney

Patented Jan. 7, 1936

2,026,824

UNITED STATES PATENT OFFICE 2,026,824

CABLE CLAMP

Ellis W. Cooper, Los Angeles, Calif.

Application June 23, 1934, Serial No. 732,109

7 Claims. (Cl. 24—135)

This invention relates to a coupling or connecting device and relates more particularly to a wire or cable clamp for connecting wires, cables and like parts. A general object of this invention is to provide a simple, inexpensive and particularly effective clamp for gripping and connecting cables, etc.

The typical cable clamps heretofore employed on guy wires and cables consisted of two plates disposed at opposite sides of the cables and bolts clamping the plates against the cables. The cable engaging faces of the plates are usually provided with flat surfaces or with grooves of partially circular cross section whose walls have engagement with the cable at only two points or lines in the diametrical longitudinal plane of the cable and so far as the gripping and holding action is concerned have the same effect as plain flat surfaces. The plates of typical cable clamps of the character just referred to each have single line contact with the cable and such clamps, therefore, deform the cable from its normal round cross sectional configuration to a considerable degree and when the cable is put under substantial tensile strain it tends to return to its normal configuration and pulls loose from the clamps. Further, the one point or single line engagement of the plates with the cable does not effectively resist or prevent lateral movement and twisting of the cable. Because of the ineffective gripping and holding action of typical clamps of the type referred to it has been found necessary to employ two or more such clamps at the looped portions of the guy lines and similar situations to produce dependable connections.

An object of the present invention is to provide an improved cable clamp that obtains a firm positive gripping and holding engagement with the cable to form a strong, dependable connecting means. In actual practice it has been found that one cable clamp of the character provided by the present invention dependably serves in situations where two or more typical cable clamps had previously been required.

Another object of this invention is to provide a cable clamp in which the body or principal plate is formed to have tight secure wedging cooperation with the cable or cables without appreciable or undesirable deformation of the cable or cables.

Another object of the invention is to provide a cable clamp having one or more grooves for receiving the cable, the opposite walls of each groove being pitched at a comparatively small angle with respect to one another and, therefore, at small angles to the plane or direction of the applied clamping force whereby the cable is tightly frictionally wedged between said walls and the retaining or clamping plate so that a great mechanical advantage is obtained. The relatively slight inclination of the walls of the grooves results in the development of extensive wedging friction between the walls of the grooves and the cable and effects a great mechanical advantage in the gripping and holding of the cable.

A further object of this invention is to provide a cable clamp of the character mentioned that is simple and inexpensive and that is easy to install.

Figure 2:
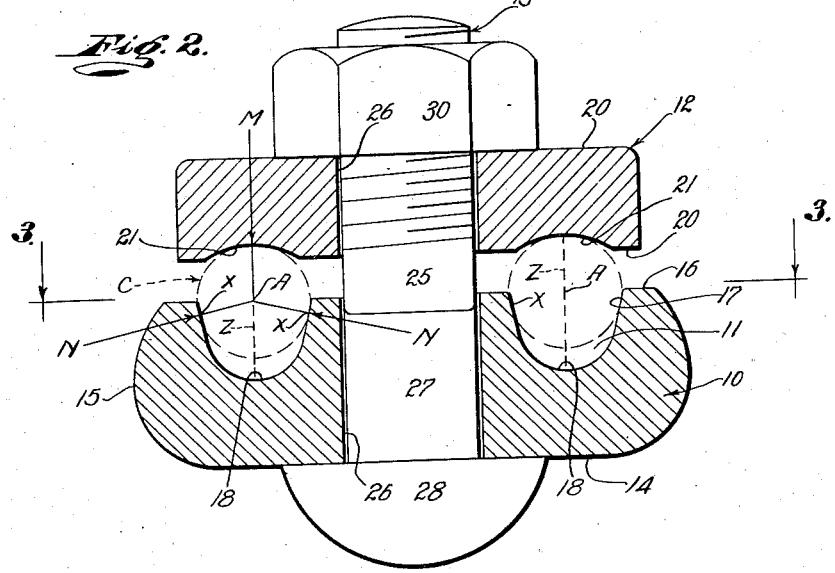
Figure 3:
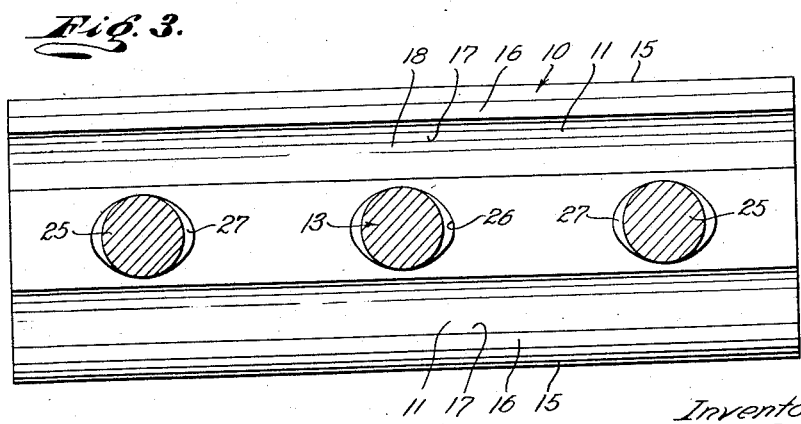

Other objects and features of the invention may be better and more fully understood from the following detailed description of a typical preferred form and application of the invention, throughout which description reference may be had to the accompanying drawing, in which:

Fig. 1 is an elevation view illustrating cable clamps of the character provided by this invention employed in connecting two lines or cables. Fig. 2 is an enlarged transverse detailed sectional view taken as indicated by line 2—2 on Fig. 1 and diagrammatically illustrating the cable in broken lines. Fig. 3 is a reduced longitudinal detailed sectional view taken as indicated by line 3—3 on Fig. 2 with the cable removed.

The clamp or connecting device of the present invention may be employed to connect wires, cables and similar parts of various characters and is adapted to be employed in various situations. In Fig. 1 of the drawing I have shown two typical or standard cables C bent back upon themselves at their adjacent ends to form loops L. Clamps or devices D of the character provided by the present invention are shown connecting the end parts P of the turned back portions of the cables with the bodies or principal parts of the cables to maintain the loops L. A typical strain insulator I is interposed between the linked or cooperating loops L. It is to be understood that the disclosure in Fig. 1 of the drawing merely illustrates a typical application of the invention and is not to be construed as limiting the invention.

The cable clamp or connecting device of this invention includes, generally, a body or principal plate 10 having one or more grooves 11 for the reception of a cable or cables C, a retaining or clamping plate 12 and means 13 for clamping the plates 10 and 12 toward one another to securely wedge and lock the cable or cables C in the grooves 11.

The body or principal plate 10 is preferably elongate to extend a suitable distance longitudinally of the cable or cables C. The plate 10 may be a simple, one piece or integral member as illustrated in the drawing and may be formed of steel or the like. While the plate 10 may be varied considerably in shape it may have a plain flat outer side 14 and suitably rounded longitudinal sides or edges 15. The inner side 16 of the body or plate 10 is preferably flat and is provided with the grooves 11 for receiving or cooperating with the cable or cables C. In the typical embodiment of the invention disclosed in the drawing two spaced parallel grooves 11 are provided in the inner side 16 of the plate 10. It is preferred to equally space the grooves 11 from the central longitudinal axis of the plate 10. The grooves 11 extend from one end of the plate to the other and are preferably of uniform or like cross sectional configuration throughout their lengths.

The shape or formation of the grooves 11 is an important feature of the present invention, the grooves being shaped to produce a particularly effective wedging frictional cooperation between their walls and the cable or cables C and to develop a great mechanical advantage when the cable or cables C are clamped between the plates 10 and 12. In accordance with the invention the side walls 17 of the grooves 11 are inclined downwardly and inwardly with respect to the inner or bottom walls 18 of the grooves. The inclination of the side walls 17 is preferably uniform from the mouths or outer ends of the grooves to the bottoms or inner walls 18. The pitch or inclination of the side walls 17 of the grooves 11 is relatively small with respect to the central longitudinal planes Z of the grooves. In practice the side walls 17 of the grooves 11 may be pitched or inclined at from approximately 12 degrees to approximately 15 degrees relative to the planes Z. I have found it practical and desirable to pitch the side walls 17 at approximately 13 degrees to the central planes Z. The grooves 11 may be made sufficiently deep with respect to the cable C for which the clamp is intended, to receive the cable so that its central longitudinal axis A is at or immediately adjacent the point of intersection of the central plane Z and a normal plane at the mouth of the groove, it being obvious that the grooves may be formed deeper if desired. The points or lines X of tangential contact between the walls 17 and the cable C are, of course, spaced below or inwardly of the axis A. The inner or bottom walls 18 of the grooves 11 may be curved and concave as illustrated. The advantages secured by forming the grooves 11 as just described will be hereinafter set forth.

The plate 12 is provided to engage the portion or portions of the cable or cables projecting from the grooves 11 to force or wedge the cable or cables into the diminishing grooves. The plate 12 is elongate and in practice may be of the same length as the body plate 10. In the simple preferred form of the invention shown in the drawing the inner and outer sides 20 of the plate 12 are flat and parallel and the plate 12 is somewhat narrower than the body plate 10. Grooves 21 are provided in the inner side 20 of the plate 12 to directly oppose the grooves 11 and cooperate with the projecting parts of the cable. The grooves 21 may be comparatively shallow and of partially circular cross section.

The means 13 for forcing or actuating the plates 10 and 12 toward one another to clamp the cable or cables C between the plates and thus wedge them into the grooves 11 is in the form of a simple screw means comprising a plurality of bolts 25. Longitudinally spaced openings 26 are provided in the plates 10 and 12 to pass the bolts 25. The bolts 25 may be in the form of track bolts in which case the openings 26 in the body plate 10 are of oval or elliptical cross section to receive the oval or elliptical shanks 27 of the bolts. The heads 28 of the bolts 25 seat or bear against the outer side 14 of the plate 10 while the threaded end portions of the bolts project beyond the outer side 20 of the plate 12. Nuts 30 are threaded on the projecting end portions of the bolts 25 to engage or clamp against the outer side 20 of the plate 12. The openings 26 in the two plates preferably intersect the central longitudinal axis of the clamp so that the bolts 25 are equally spaced between the two cable receiving grooves 11.

It is believed that it will be apparent how the clamps D may be assembled on the end portions P and the bodies of the cables C to form or maintain the loops L illustrated in Fig. 1 of the drawing. The tightening down of the nuts 30 on the bolts 25 of course forces the plates 10 and 12 toward one another so that the walls 17 of the grooves 11 and the walls of the grooves 21 engage and clamp against the cable. To obtain the maximum holding power of the clamp the heads 28 of the bolts 25 may be struck during the tightening together of the clamp to force or wedge the cable C into the grooves 11 through a hammering action. The cable gripping forces exerted by the longitudinally spaced and centrally disposed bolts 25 are substantially equally divided by the two cables C or the two portions of the single length of cable engaged by the clamp. The components and resultants of the forces acting on the cable C may be diagrammatically illustrated in various manners. In the left hand portion of the Fig. 2 of the drawing I have partially diagrammatically illustrated the forces acting on one cable or one length of cable C, it being obvious that these forces are approximately one half of the total force exerted by the bolts 25 and nuts 30 where two cables or two portions of a cable are engaged by the clamp.

In the left hand portion of Fig. 2 of the drawing the line M represents the force applied to the cable C by the plate 12 considering the body plate 10 as stationary and the plate 12 as clamped toward the body plate 10. It is evident that the force M thus applied to the cable C is resolved into two lines of forces or two forces N passing through the zones or lines of contact X of the cable C with the groove walls 17. These forces or lines of force are substantially normal to the groove walls 17 and the tangential areas of contact of the cable C with the walls 17 and are, therefore, inclined with respect to the line M. No attempt has been made in the diagrammatic illustration in the drawing to relate the lengths of the lines M and N to the degrees or intensities of the forces involved. In determining the intensity of the forces N by well known means it will be found that they are much greater than the force M. When the forces N have been resolved or determined by means of triangulation or trigonometrical calculation it is found that they are many times greater than the component or applied force M. The dry metallic surfaces having wedging frictional cooperation at the lines or areas X have a high coefficient of friction so that the cable C is tightly gripped and held by the clamp.

The relatively slight inclination of the groove walls 17 results in a maximum frictional and wedging engagement between the cable C and the walls 17 so that great movement-resisting frictional cooperation is obtained. The three point or three line contact of the clamp with each cable or each portion of cable C does not deform the cable to the same extent as the clamps heretofore employed which have two point or two line contact with the cable. The three areas of engagement of the plates 10 and 12 with the cable are tangent with regard to the circumference of the cable and are substantially symmetrically disposed about the cable so that the clamping forces on the cable do not tend to flatten the cable to elliptical form. Accordingly the cable is not loosened from the clamp when put under heavy tensile strains which tend to return it to its normal cross-sectional configuration.

The cable clamp of the present invention is fully distinguished over the clamps heretofore employed which have had substantially flat normal cable engaging surfaces or wide mouthed grooves of partially circular cross section or grooves whose walls are disposed at great angles with reference to one another by the fact that hammering the cable C into the grooves 11 either directly or by hammering on the bolts 25 causes the cables C to be wedged in the grooves 11 to such an extent that they remain in the grooves and resist displacement, whereas in clamps of the character heretofore employed cables thus hammered in the grooves would immediately spring out of the grooves. The grooves 11 in the clamp of the present invention are proportioned with respect to the cable C and are provided with side walls 17 pitched or inclined so that the cable C is tightly wedged in the grooves and an effective positive holding engagement is obtained between the plates 10 and 12 and the cable.

Having described only a typical preferred form and application of my invention, I do not wish to be limited or restricted to the specific form and application herein set forth, but wish to reserve to myself any modifications or variations that may appear to those skilled in the art or fall within the scope of the following claims.

Having described my invention, I claim:

1. A cable clamp for use on a cable of a given diameter including, two plate members, one member having a groove of inwardly diminishing cross section for partially receiving a cable, said groove having substantially flat cable engaging walls pitched at a comparatively small angle with respect to one another, the groove being so proportioned with respect to the diameter of the cable that the cable cannot engage the bottom wall of the groove and has a portion projecting from the mouth of the groove, the other member being adapted to engage the portion of the cable projecting from the groove, and means for forcing the members toward one another to wedge the cable in the groove.

2. A cable clamp of the character described including, two plate members, one member having a groove of inwardly diminishing cross section for partially receiving a cable, said groove having substantially flat cable engaging walls pitched at approximately 26 degrees to one another, the groove being so proportioned with respect to the diameter of the cable that the cable has a portion projecting from the mouth of the groove and is free of the bottom wall of the groove when under inward distorting pressure, the other member being adapted to engage the portion of the cable projecting from the groove, and means for actuating the members toward one another to wedge the cable between said walls.

3. A cable clamp of the character described including two members, one having a groove for receiving a cable of a given diameter, the other being adapted to engage the cable, and means for forcing the members toward one another to force the cable inwardly in the groove, said groove having inwardly converging walls and being so shaped and proportioned with respect to the cable that the cable remains wedged therein and projects from the mouth of the groove upon being driven into the groove and is spaced from the bottom wall of the groove when under inward pressure whereby the cable is tightly held in said groove by a wedging action by the operation of said means.

4. A cable clamp of the character described including a body member having a groove for receiving a cable of a given diameter, and means for clamping against the cable to force the same inwardly in the groove, said groove having inwardly converging walls and being so shaped and proportioned with respect to the cable that the cable remains wedged therein and is spaced from the bottom wall of the groove when otherwise unconstrained after being driven in the groove whereby the cable is tightly wedged in the groove by the action of said means.

5. A cable clamp including two plates, one plate having spaced grooves for partially receiving cable, the other plate being adapted to engage the cable projecting from the grooves, and screw means for forcing the plates toward one another, said grooves having substantially flat cable engaging walls pitched at relatively slight angles and being so proportioned with respect to the cable that they prevent the cable from engaging their bottom walls whereby the cable has contact only with said walls of the grooves and said other plate.

6. A cable clamp including two plates, one plate having spaced grooves for partially receiving cable, the other plate being adapted to engage the cable projecting from the grooves, and screw means for forcing the plates toward one another, each of said grooves having substantially flat cable engaging walls pitched at approximately 26 degrees with respect to one another and the grooves being so proportioned with respect to the cable that they prevent the cable from engaging their bottom walls whereby the cable has contact only with said walls and said other plate.

7. In combination with a cable of a given diameter, a cable clamp comprising two plates, one plate having a cable receiving groove having substantially flat side walls converging inwardly at relatively slight angles and so proportioned with respect to the diameter of said cable that the cable bears on said side walls to be free of the bottom wall of the groove and projects from the mouth of the groove, the other plate being adapted to engage the projecting portion of the cable, and means for forcing the plates toward one another to force the cable into the groove whereby the cable is frictionally engaged and gripped by said side walls and a surface of said other plate.

ELLIS W. COOPER.